(12) United States Patent
Van der Paal (10) Patent No.: US 11,056,872 B2
(45) Date of Patent: Jul. 6, 2021

(54) MOTORIZED CABLE REEL (71) Applicant: Alpha Reel bvba, Sint-Gillis-Waas (BE)

(72) Inventor: Peter Van der Paal, Sint-Gillis-Waas (BE)

(73) Assignee: Alpha Reel bvba, Sint-Gillis-Waas (BE)

(*) Notice: Subject to any disclaimer, the term of this patent is extended or adjusted under 35 U.S.C. 154(b) by 294 days.

(21) Appl. No.: 16/154,812

(22) Filed: Oct. 9, 2018

(65) Prior Publication Data
US 2019/0109449 A1    Apr. 11, 2019

(30) Foreign Application Priority Data

Oct. 9, 2017  (EP) .................................... 17195469

(51) Int. Cl.
*H02G 11/02* (2006.01)
*B65H 75/44* (2006.01)

(52) U.S. Cl.
CPC ......... *H02G 11/02* (2013.01); *B65H 75/4402* (2013.01); *B65H 75/4418* (2013.01)

(58) Field of Classification Search
CPC ............................... H02G 11/00; H02G 11/02
See application file for complete search history.

(56) References Cited

FOREIGN PATENT DOCUMENTS

| DE | 1828448 U | 3/1961 | |
| EP | 1551086 A1 * | 7/2005 | ............. H02G 11/02 |
| EP | 1551086 A1 | 7/2005 | |
| GB | 1537295 A | 12/1978 | |
| GB | 2313592 A | 12/1997 | |
| WO | 2014209261 A1 | 12/2014 | |

* cited by examiner

*Primary Examiner* — Robert J McCarry, Jr.
(74) *Attorney, Agent, or Firm* — James Creighton Wray (57) ABSTRACT

The current invention concerns an improved motorized cable reel, specifically for a more stable and safer winding of the cables therearound.

18 Claims, 5 Drawing Sheets

MOTORIZED CABLE REEL

This application claims the benefit of European Application No. EP17195469.6 filed Oct. 9, 2017, which is hereby incorporated by reference in its entirety as if fully set forth herein.

TECHNICAL FIELD

The invention pertains to the technical field of cable reel assemblies, particularly motorized cable reels for use in industrial settings (e.g. automotive), specifically for use with power tools in such a setting, where said tools need fairly high amounts of power, and are therefore wiredly connected to a power source via cables. Said reel allows a safer and faster winding and unwinding of the cable to facilitate the use of said cables in the industry.

BACKGROUND

Reels having cables or hoses wound thereon are frequently applied in the industry, for instance in automotive assembly plants and the likes. In automotive factories, flexible cables, applied to connect electrical tools to a PLC controller unit, are usually left to lie on the factory floor during production. Linked to a fixed controller unit on one end, and to a portable tightening tool (e.g. nutrunners, screwdrivers, etc.) on the other end, this tangle of cables significantly increases the risks of tripping accidents which may cause physical injuries, property damage, and lost production time.

A number of different types of cable reels are available on the market. However, a common disadvantage of known cable reels is that the unwinding and retracting mechanism is not efficient and, therefore, not suitable for use along automotive assembly lines.

Due to the dangerous environment, and the need for high efficiency, the cables supplying power to the electronically-driven power tools cannot lie slack, and are to be reeled in when not in use. In many plants, the cables are left unreeled throughout the working day, and only rewound at the end of the working day. Loose cables are not only a safety issues for operators, but can also greatly hinder operational activity in such an assembly plant (or similar plants), and can cause damage to the installation (considering the cables are often connected to more delicate electronics) and production. Having the operators reel in the cables after each work is unproductive, and leaves great margin for human errors and oversight, doubly so if the cables are to be reeled in manually.

Furthermore, the applicant noticed that the retraction process for tool cables is unnecessarily cumbersome or requires a substantial investment in materials. In many cases, in order for a tool cable to be rewound onto a cable reel assembly, the operator needs to flip a switch manually on the cable reel assembly, and thus has to move from his post, since most portable tools do not possess spare switches or triggers besides one to control the power supply, since more advances tools cost substantially more and/or require a more sophisticated tool cable, capable of relaying a number of separate signals. The applicant wishes to address this situation by an aspect of the invention at hand.

One of the other objects of the present invention is to provide an improved cable reel assembly whereby signal and power supply are duly separated to reduce interference, while ensuring that conductive paths are properly shielded from outside influences common in the field of the application, being industrial settings. Said influences comprise dust, grease, oil, water and other contaminants which might (dangerously) impact the electrical pathways, for instance by creating short-circuits or by blocking intended electrical contacts, thus unintentionally interrupting electrical pathways. The applicant has noticed that too often, this can create perilous situations, considering the fact that the cable reel assembly is used to control high power electronic tools for use on large mechanical constructs. Notwithstanding the danger to the operators, one also needs to consider the economic repercussions if a reel assembly breaks down/fails due to electrical problems. Production is slowed down, and possibly orders or quota are not met, while the reel assembly needs to be repaired which is an additional cost.

Additionally, the applicant wishes to simplify the communication for the operator, between the electronic portable tool that is used, and the power supply and control system of the reel assembly. Easy and reliably retraction of the tool cable is crucial for safety on the work floor, but it is preferred that this is achieved by a minimal expenditure. For instance, the electronic portable tools are most often purchased modularly and separate from the cable reel. Though the interoperability is mostly guaranteed, the portable tools do not always have the same functionalities. For instance, cheaper tools do not have a way to allow the user to issue a command to the reel assembly to retract the tool cable. If they do, this is via a separate pathway, which adds to the cost and complexity of the tool, as it is an extra button or switch or trigger for the operator to use, and to be familiar with.

Finally, the applicant wishes to provide a cable reel assembly in which the power pathways are fully separated from the communication pathways to avoid electromagnetic interference. This further builds upon the previous objects, of properly shielding said pathways from outside interference, and also from each other.

There remains a need in the art for an improved cable reel tackling one or more of the aforementioned problems.

SUMMARY OF THE INVENTION

In a first aspect, the present invention provides an improved cable reel assembly for holding a wound quantity of tool cable, wherein said tool cable comprises at a first end a means to connect to a portable electrical tool, and at the other end a means to connect to an electronic control system for said tool, said cable reel assembly comprising:
 a. a supporting frame having a fixed hub holding an elongated shaft projecting from said hub and said supporting frame, said shaft having a central axial aperture extending therethrough;
 b. a slip ring capsule for signal transfer, said slip ring capsule being provided within the central axial aperture in said shaft and along the central axis of said shaft, said slip ring capsule comprising:
   a. a set of contact brushes;
   b. a set of contact slip rings for electrical contact with the set of contact brushes, and rotatably mounted relative to the set of contact brushes;
 c. a rotatable reel comprising a hub, whereby said hub is mounted rotatably around the shaft, which reel further comprises a hollow drum attached to said hub, preferably said hollow drum comprising two flanges projecting radially therefrom, with said flanges having sufficient height to accommodate a cable therebetween wound on said drum;
 d. an electric motor for alternately rotating said drum around said shaft in a first direction to pay out a cable attached to said drum, and for rotating said drum around said shaft in a second opposite direction to retrieve paid out cable for containment on said drum;

e. an electronic control system to drive and control the rotation of the reel;

characterized in that the shaft comprises at least one, preferably circular, contact ring on its outer surface, and whereby said reel further comprises a contact brush holder comprising at least one contact brush for continuous electrical contact and transferring electric power, for the portable electronic tool, with the at least one contact ring on the shaft, which contact brush holder is attached to the hollow drum extending along the axis of rotation of the hub of the reel.

In a second aspect, the present invention concerns an improved cable reel assembly for holding a wound quantity of tool cable, wherein said tool cable comprises at a first end a means to connect to a portable electrical tool, and at the other end a means to connect to an electronic control system for said tool, and wherein said cable reel assembly comprises an electronic control system to drive and control the rotation of the reel assembly for retracting or paying out the tool cable, whereby the electronic control system is adapted to receive signals from the portable electronic tool attached at the first end of the tool cable, and whereby the electronic control system is further adapted to detect pulses in said signals and count one or more subsequent pulses, characterized in that the electronic control system is configured to execute one or more pre-programmed actions based on the detected number of subsequent pulses, said pre-programmed actions comprising: starting the retraction of the tool cable, stopping the retraction of the tool cable, and preferably furthermore comprising slowing down the retraction of the tool cable and speeding up the retraction of the tool cable. It is to be noted that this aspect of the invention may be combined with the first aspect.

In a third aspect, the invention describes the use in the automotive industry of a cable reel assembly according to any one of the preceding embodiments.

In a fourth aspect, the present invention provides an improved cable reel assembly for holding a wound quantity of tool cable, wherein said tool cable comprises at a first end a means to connect to a portable electrical tool, and at the other end a means to connect to an electronic control system for said tool, said cable reel assembly comprising:

a. a supporting frame having a fixed hub holding an elongated shaft projecting from said hub and said supporting frame, said shaft having a central axial aperture extending therethrough;

b. a slip ring capsule for signal transfer, said slip ring capsule being provided within the central axial aperture in said shaft and along the central axis of said shaft, said slip ring capsule comprising:
  a. a set of contact brushes;
  b. a set of contact slip rings for electrical contact with the set of contact brushes, and rotatably mounted relative to the set of contact brushes;

c. a rotatable reel comprising a hub, whereby said hub is mounted rotatably around the shaft, which reel further comprises a hollow drum attached to said hub, preferably said hollow drum comprising two flanges projecting radially therefrom, with said flanges having sufficient height to accommodate a cable therebetween wound on said drum;

d. an electric motor for alternately rotating said drum around said shaft in a first direction to pay out a cable attached to said reel assembly, and for rotating said drum around said shaft in a second opposite direction to retrieve paid out cable for containment on said reel assembly;

e. an electronic control system to drive and control the rotation of the drum;

f. a guiding means for guiding the cable to and from the drum, whereby said guiding means is rotatably mounted on and around the shaft, whereby said guiding means is adapted to rotatably move between a wound position and a winding position, said guiding means comprising a cable guide for leading the cable whereby the cable guide is adapted for obstructing the first end of said cable, and whereby the guiding means is moved to the wound position when the cable guide is contacting the first end;

g. a pulling means, preferably a spring member, for exerting a torque on the guiding means towards the winding position;

whereby the cable reel assembly comprises a position sensor for determining the (rotational) positioning of the guiding means, whereby said the electronic control system controls the rotation of the reel based on said positioning.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The term "elastic material" refers to a material suitable to absorb shocks from sudden impacts. A suitable material could thus be rubber or similar materials. However, it is important, the materials still are durable enough to not wear out easily under said impacts. Preferably, the elastic material has a hardness (under (Shore) durometer values) of at most 90, preferably at most 80, more preferably at most 70, for instance 60.

The term "contact rings", and "contact brush holder" can generally refer to a rotary electrical joint mechanism, whereby an electrical contact is established and maintained between a stationary and a rotary element. A possible embodiment thereof can be a slip ring mechanism or capsule.

Note that most if not all of the following embodiments may be easily combined with other embodiments, and said combinations should as such be considered to be part of the inventive concept as disclosed herein.

In a first aspect, the present invention provides an improved cable reel assembly for holding a wound quantity of tool cable, wherein said tool cable comprises at a first end a means to connect to a portable electrical tool, and at the other end a means to connect to an electronic control system for said tool, said cable reel assembly comprising:
  a. a supporting frame having a fixed hub holding an elongated shaft projecting from said hub and said supporting frame, said shaft having a central axial aperture extending therethrough;
  b. a slip ring capsule for signal transfer, said slip ring capsule being provided within the central axial aperture in said shaft and along the central axis of said shaft, said slip ring capsule comprising:
    a. a set of contact brushes;
    b. a set of contact slip rings for electrical contact with the set of contact brushes, and rotatably mounted relative to the set of contact brushes;
  c. a rotatable reel comprising a hub, whereby said hub is mounted rotatably around the shaft, which reel further comprises a hollow drum attached to said hub, preferably said hollow drum comprising two flanges projecting radially therefrom, with said flanges having sufficient height to accommodate a cable therebetween wound on said drum;
  d. an electric motor for alternately rotating said drum around said shaft in a first direction to pay out a cable attached to said reel assembly (and/or drum), and for rotating said drum around said shaft in a second opposite direction to retrieve paid out cable for containment on said reel assembly (and/or drum);
  e. an electronic control system to drive and control the rotation of the reel;
characterized in that the shaft comprises at least one, preferably circular, contact ring on its outer surface, and whereby said reel further comprises a contact brush holder comprising at least one contact brush for continuous electrical contact and transferring electric power, for the portable electronic tool, with the at least one contact ring on the shaft, which contact brush holder is attached to the hollow drum extending along the axis of rotation of the hub of the reel.

The applicant has noticed that in prior art cable reel assemblies, for instance EP 1,551,086 A1, the power supply is transferred from a stationary member to a rotary member via a number of contact brushes and contact rings, the contact brushes remaining stationary while the contact rings rotate around their axis. The applicant observed that it was advantageous to reverse this situation, and thus implemented a cable reel assembly where the contact rings remained stationary, while the contact brush holder is rotated around the contact rings. Mechanically, this allows for a far easier construction of the cable reel and for an easier connection of the power supply from the contact brush holder to the tool cable, as can be seen in the Figures.

Figure 2:
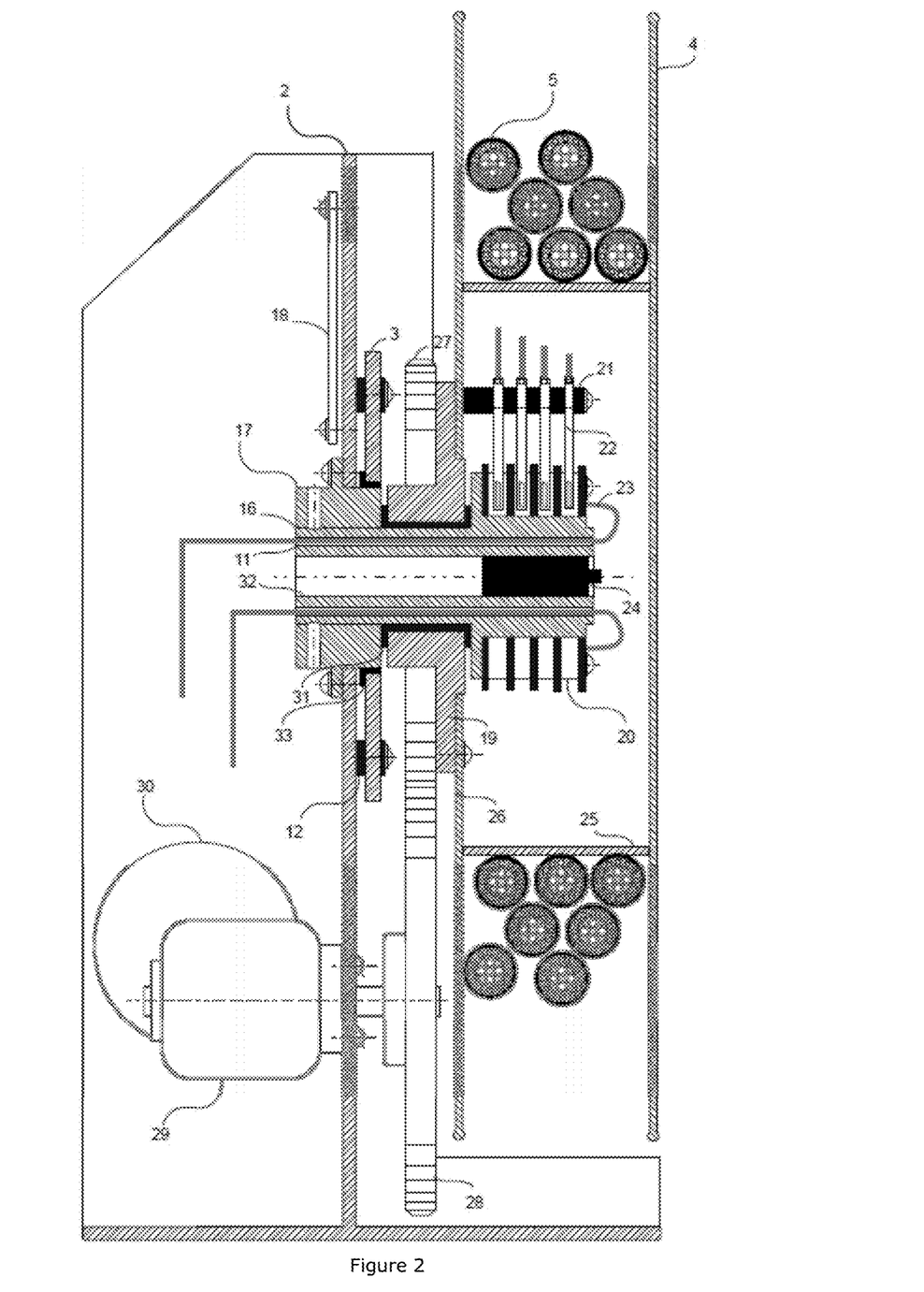
FIG. 2 shows a detailed view of the interior structure of the present invention.

It is furthermore to be considered that stationary contact brushes unnecessarily enlarge the cable reel assembly in its depth (again, as seen in FIG. 2 of EP 1,551,086 A1), which is undesirable, not only to keep the assembly compact, but additionally because this will increase the moment caused by forces on the cable reel, which can damage the elements thereof.

Furthermore, it is to be noted that in the invention, the applicant explicitly separates the power supply from the control signal transfer by using two separate slip ring assemblies, as the applicant found that using a single assembly to transfer both power and control signals to a rotary medium, created interference upon the signals due to electromagnetic radiation. This interference is liable to create intermittent faults, which are notoriously difficult to identify and to compensate for. Additionally, the applicant furthermore found it preferable to shield the power conductors to minimize electromagnetic interference in the signal exchange, preferably by providing tinned copper braid shielding around the wiring that conducts the power to the contact rings (from the power source), and preferably also around the wiring that conducts the power from the contact brushes to the tool cable.

In a preferred embodiment, the portion of the shaft comprising said contact ring is provided within the hollow drum, and whereby the contact brush holder is provided within the hollow drum.

As mentioned previously, one of the problems the applicant encountered in EP 1,551,086 A1 is that the conducting pathways used in cable reels are quickly polluted and affected by contaminants that are common in the setting they are used in, industrial applications, often automotive or similar plants, where (metal) dust is omnipresent, as well as liquids such as oil and water via mist or condense. It is to be understood that this problem makes the prior art systems entirely unfit to be used outdoors where contaminants, both particulate as liquid, are much more of a problem, whereas the system of the invention is particularly suitable for such applications. As such, the risk of these contaminants somehow affecting the conducting pathways that are open is quite real, and understandably can come with dire effects, such as short-circuiting a tool or interrupting power supply to a tool, and in worst cases creating a very real danger of electrocution of an operator or others in the vicinity by creating a conductive path to the rest of the assembly, which often comprises metal.

Given the fact that in cable reel assemblies, there is a need to supply power as well as control signals from a stationary contact to a rotary contact (and vice versa for the control signals), slip ring mechanisms are used to accomplish this. This has the disadvantage that a number of contact surfaces are present (and uncovered) which can be affected by the contaminants. Note that although a shielding can be provided, as in FIG. 2 of EP 1,551,086 A1, this does little to stop dust and metal filings from entering since the construction cannot be entirely closed to protect the power supply contact rings and brushes.

What is worse, these partially-closed environments for the slip ring assemblies of prior art systems do allow contaminants in which can foul up the electrical contacts, but then greatly inconvenience cleaning of these contacts. One can imagine that for prior art assemblies, there is a need to clean said slip ring assemblies on regular bases, but the actual design hinders such policies from being enacted efficiently as it would require the entire cable reel assembly to be taken out of production, dismantled and disconnected, to be cleaned, after which it needs to be reinstalled.

The applicant therefore proposes a cable reel assembly whereby the contact brush holder and the contact rings are mounted within the hollow drum of the reel. In doing so, the contact brushes and rings are entirely protected from dust and other contaminants since the drum is fully closed (mostly on its own, with an opening through which the shaft extends, thereby closing the drum entirely from any outside influences). This means that, aside from ensuring that the contacts are kept clean and no dangerous situations such as short-circuits or connection failures can arise, there is also no need for regular maintenance. The power supply can provide electrical power to the contact rings through wiring which, in the improved cable reel assembly according to the invention, can be properly shielded and said electrical power can be led to the contact rings without being exposed to the outside atmosphere (and contaminants therein). The same principle applies to the contact brushes, which are kept entirely inside of the hollow drum, and are led to the tool cable to complete the electrical pathway to the electronic portable tool. This connection of the contact brushes to the tool cable is most likely accomplished by (shielded) wiring leading from the contact brushes to the mantle of the hollow drum, to which the tool cable is connected at one end.

In a preferred embodiment, the contact brushes of the contact brush holder are electrically connected directly to the tool cable to provide power to said tool cable. This direct connection (or via a dedicated connection, preferably shielded) ensures minimal interference with the control signals that are also supplied to the tool cable. Separating the power supply and the control signals for as long as possible is therefore strongly desired.

In a preferred embodiment, the slip ring capsule is at least partially provided, preferably entirely, within the hollow drum. This makes the assembly more compact, but also grants further protection to the (fragile) slip ring capsule. Essentially, the slip ring capsule is placed within the shaft around which the contact ring for the power supply is provided. This way, both the power supply and the control signal transfer are strongly separated from each other, reducing interference, while this also greatly simplifies construction, as there are 'separate' transfer means for control signals and power (slip ring capsule and contact brush holder-contact ring). The slip ring capsule is comprised within a central aperture in the shaft, which ensures that the outer part of the slip ring capsule remains stationary, acting as the stator, while the central part rotates along with the reel as the rotor. Said rotor and stator are in contact via a plurality of radial electrical contacts projecting therefrom. From this central part, wiring departs that connect to the tool cable in order to further transfer the signals passed on via the slip ring capsule.

In a preferred embodiment, the rotatable (motor-driven) reel comprises a gear wheel, preferably mounted attached to the hub of the reel, and whereby the electric motor comprises a second gear wheel in continuous driving contact with the gear wheel of the drum.

Using gear wheels to affect the rotation of the drum is the most efficient solution in the type of application, as gear wheel serve excellently for high duty use, are very durable and are able to produce a reliable speed of rotation for the drum. Furthermore, they can be easily implemented in the configuration of the cable reel assembly on or against the drum, since they share the general shape (round) and can be securely attached thereto.

In a further preferred embodiment, the electric motor comprises a worm drive gear and said electric motor being adapted to drive said worm drive gear, whereby said worm drive gear comprises a shaft upon which the gear wheel of the electric motor is mounted to effect rotation of said gear wheel by said worm drive gear.

In general, motors provided with a worm drive gear generally have the characteristic of being "self-braking" and this type of gearing does not enable an output shaft to be brought into rotation without eventually damaging the internal gearing members. The applicants have found that selection of a particular gearing angle, in particular an angle from about 5° to 18°, a "semi-self-braking motor" can be obtained which is particularly suitable for use in the present embodiment as the internal friction of the motor and gear configuration generates a slight counterforce.

With the driving components in direct and continuous engagement with the reel, the said counterforce is applied to avoid the drum from uncontrolled rotation once the operator ceases pulling the cable. Consequently, this embodiment enables only the desired length of cable to be dispensed. As the said counterforce decelerate the rotation of the drum, no tangle of cable is created on the factory floor, which in turn significantly reduces the risks of tripping accidents.

The applicants have also found that a careful selected transmission ratio between the driving components and the drum, allows a delicate balance between two conflicting forces, notably, the physical force necessary to unwind the cable manually on the one hand, and the counterforce preventing the drum from uncontrolled rotation on the other hand. By applying a "semi-self-braking motor" and a particular gear ration between its driving means and the drum, the physical force required for unwinding the cable manually is comprised between 2 and 6 Nf, whereas the aforementioned counterforce, generated by the motor and gear configuration, remains sufficient to prevent uncontrolled rotation of the drum once pulling the cable has ceased.

In a preferred embodiment, the cable reel assembly further comprises a guiding means mounted rotatably around the shaft, whereby the distal end of the guiding means comprises a cable guide provided with a set of rollers for guiding the tool cable to and from the drum, and whereby said guiding means is connected by a spring member to the supporting frame, whereby said spring member extends essentially tangentially around said shaft, preferably whereby the spring member is connected to the guiding means on the opposite side of the cable guide with respect to the rotational axis of the guiding means.

In a further problem, when the tool cable is retrieved, the bumper means at the end of the tool cable (so as not to damage the tool when the cable is fully wound up) is observed to harshly impact upon an "impact collector" of the reel assembly designed to 'catch' the bumper means. However, the sudden impact is still likely to cause damage to the tool cable on the long run, and considering the heavy usage of such tool cables, this damage is all the more likely. The applicant noticed that to fully compensate for the shock when the tool cable is fully wound up, further dampening or reduction of impact needed to be provided. This can be achieved by a guiding means that can pivot around the shaft between a winding position, in which the spring member is minimally extended from its equilibrium position, and a wound position, which is reached when the tool cable is fully retracted (by the tool or bumper means reaching the cable guide and thereby pulling the guiding means to said wound position). The wound position however necessitates the spring member to leave its equilibrium position, thereby already absorbing some or even most of the impact of the rubber obstruction (bumper means) hitting the cable guide once the guiding means is in wound position.

In a further preferred embodiment, the cable reel assembly comprises a switching means, preferably mounted on the supporting frame, said switching means being adapted to determine the rotational movement of the guiding means, and configured to control the electric motor based on said rotational movement.

By providing a switching means that can determine the rotational movement of the guiding means, preferably an inductive switching means adapted to detect rotational movement (of the guiding means), the electric motor can be issued a command to stop reeling in the cable. By doing this before the guiding means fully reaches the wound position, this will makes sure that the impact of the rubber obstruction against the cable guide, and thus on the guiding means, is severely lessened, this to avoid damage to tool, tool cable and/or assembly.

In an even further preferred embodiment, the switching means is configured to halt the rotation of the reel when the rotational movement of the guiding means passes a pre-defined cut-off position in the second direction.

As mentioned, the cut-off position can determine whether the guiding means is almost in the wound position, in which case the reeling in of the tool cable is to be halted (or at least slowed down), to minimize impact on the guiding means and cable guide.

In a further preferred embodiment, the guiding means is mounted rotatably around the shaft and positioned between the hollow drum and the supporting frame, and whereby the guiding means is mounted on said shaft by low-friction bearing materials.

In a preferred embodiment, said hollow drum comprises a closed barrel with a cavity wherein the contact brush holder and the contact ring of the shaft are positioned, whereby the barrel is entirely closed at the furthest end of the barrel facing away from the supporting frame and whereby the closest end of the barrel facing towards the supporting frame is attached to the hub of the drum thereby forming a closed surface around the shaft, and whereby the hub of the drum is rotatably mounted on the shaft by bearing materials.

The bearing materials bearing the closed barrel of the hollow drum ensure that no contaminants can enter the barrel to foul up the electrical pathways of the contact ring(s) and the contact brush(es).

In a preferred embodiment, one or more power conductors for conducting the electric power from a power source or the electronic control system of the tool, to the contact ring on the shaft, extend axially through said shaft from one side of the supporting frame to the opposite side, preferably whereby there are at least two or more of said power conductors whereby said at least two or more power conductors extend separately via non-central axial passages through the shaft.

Again, by having a number of passages extending parallel to but separate from the central axial aperture, through which number of passages one or more power conductors are extended, said power conductors are even further shielded from the wiring that transfers the control signals to and from the portable electronic tool, thus reducing the chance of electromagnetic interference.

In a preferred embodiment, the power conductors are shielded to minimize electromagnetic interference, and whereby the contact slip rings of the slip ring capsule comprise gold, preferably a golden coating, and preferably whereby the contact brushes of the slip ring capsule comprise gold, preferably a golden coating.

In a preferred embodiment, the electronic control system of the reel assembly is adapted to receive signals from a portable electronic tool attached at the first end of the tool cable, and whereby the electronic control system is further adapted to detect pulses in said signals and count one or more subsequent pulses, characterized in that the electronic control system is configured to execute one or more pre-programmed actions based on the detected number of subsequent pulses, said pre-programmed actions comprising starting the retraction of the tool cable, stopping the retraction of the tool cable, and preferably furthermore comprising slowing down the retraction of the tool cable and speeding up the retraction of the tool cable.

The advantages as discussed in the previous embodiments of course apply to this specific embodiment as well.

In a preferred embodiment, the tool cable is provided with a portable electronic tool at said first end, whereby said portable electronic tool comprises a tool trigger switch to send signals to the electronic control system of the tool for starting or stopping the supply of power to the portable electronic tool, and whereby the signals of said tool trigger switch are analyzed to detect and count subsequent pulses in said signals for the starting or stopping the retraction of the tool cable based on the number of said subsequent pulses.

It is to be understood that any of the following aspects of the invention may be combined with the embodiments of the first aspect of the invention as discussed above.

In a second aspect, the present invention provides an improved cable reel assembly for holding a wound quantity of tool cable, wherein said tool cable comprises at a first end a means to connect to a portable electrical tool, and at the other end a means to connect to an electronic control system for said tool, and wherein said cable reel assembly comprises an electronic control system to drive and control the rotation of the reel assembly for retracting or paying out the tool cable, whereby the electronic control system is adapted to receive signals from the portable electronic tool attached at the first end of the tool cable, and whereby the electronic control system is further adapted to detect pulses in said signals and count one or more subsequent pulses, characterized in that the electronic control system is configured to execute one or more pre-programmed actions based on the detected number of subsequent pulses, said pre-programmed actions comprising: starting the retraction of the tool cable, stopping the retraction of the tool cable, and preferably furthermore comprising slowing down the retraction of the tool cable and speeding up the retraction of the tool cable.

The applicants of present invention have found a way of launching the motorized retraction of the cable from a distance by extending the typical functionality of the tool trigger switch. In particular, if the cable reel is provided with an electronic control board (electron control system) with microprocessor, it allows capturing and converting incoming signals from a tool trigger switch into various functions other than starting or stopping the tool motor. The reel controller board can capture analogue or digital signals running back and forth between the tool controller unit and the tool trigger switch, whereas the microprocessor can be programmed with a pulse communication scheme to convert said signals into, for example, a retrieve signal. This method, new in the field of cable reel technology, makes it possible for the assembly line operator to use said tool trigger switch to control the motor-driven cable reel from a distance by giving one or more pulls to the trigger switch of the tool he is holding. In prior art systems, the operator needs to return from his work post to the cable reel assembly and manually flip a switch (or push a button for instance) in order to retract the paid out tool cable.

In a preferred embodiment, said signals from the portable electronic tool are control signals for starting or stopping the supply of power to the portable electronic tool. By using this signal both as a way to control power supply, but also to issue commands with respect to retraction of the tool cable, the applicant cleverly takes advantage of this existing communication channel, and does not need an additional communication channel on the tool cable or an additional trigger or switch on the portable tool for relaying these commands to the cable reel assembly.

In a preferred embodiment, the cable reel assembly comprises a portable electronic tool, whereby said portable electronic tool comprises a tool trigger switch to send signals to the electronic control system for starting or stopping the supply of power to the portable electronic tool, and whereby the signals of said tool trigger switch are analyzed to detect and count subsequent pulses in said signals for the starting or stopping the retraction of the tool cable based on the number of said subsequent pulses.

In a preferred embodiment, the electronic control system drives and controls the rotation of a reel for collecting or paying out the tool cable, said reel being mounted rotatably on a supporting frame around a shaft projecting from said supporting frame.

It is to be considered that many portable electronic tools currently used have no specific or spare trigger or switch member that can be used to control the retraction, but only an 'on' trigger. The applicant therefore proposes to implement a system wherein predefined patterns of pulse signals from the portable tool trigger are recognized to comprise retraction signals (start, stop, slow down, speed up, etcetera).

Should the portable tool however have a spare trigger, it is of course clear that this can be used for retraction signals as well. By applying this method, the assembly line operator can launch the motorized retraction from a distance while returning to his initial starting position. With the retraction speed set at the right value, he does not have to step over the cable and, therefore, does not have to take care as to where to put his feet. This is the preferred modus operandi for portable electrical tools with spare switch member.

Portable electrical tools without spare switch member can be programmed as such that, as soon as the operator has finished his tightening job, a retrieve signal is send from the tool controller unit or from factory's Control Room to the reel controller board. The retrieve signal may be generated immediately or seconds after the operator has finished his job. For this particular reason, the present cable reel is fitted with an I/O connector to send or receive electric signals, while one or more extra channels in the slip ring capsule for signals are held in reserve. With the retraction speed set at the right value, the assembly line operator does not have to step over the cable and, therefore, does not have to take care as to where to put his feet.

Portable electrical tools without spare switch member can also be furnished with a compact communication device for transmitting wireless signals to a receiver module provided inside the reel. In a preferred embodiment the transmitter is connected directly to the power supply of the tool, rendering the need for extra power source obsolete and, consequently, allowing the transmitter module to be smaller and lighter. By implementing this method and with the retraction speed set at the right value, the assembly line operator does not have to step over the cable and, therefore, does not have to take care as to where to put his feet.

Portable electrical tools without spare switch member can be programmed as such that a retrieve signal is given through the I/O connector of the reel the moment the assembly line operator puts his tool in a tool holder with integrated switch device. With this method, however, the motorized retraction is not launched from a distance but can only be launched after the assembly line operator has returned to his initial starting position. Applying this method, the assembly line operator has to step over the cable and has to take care as to where to put his feet.

Figure 5:
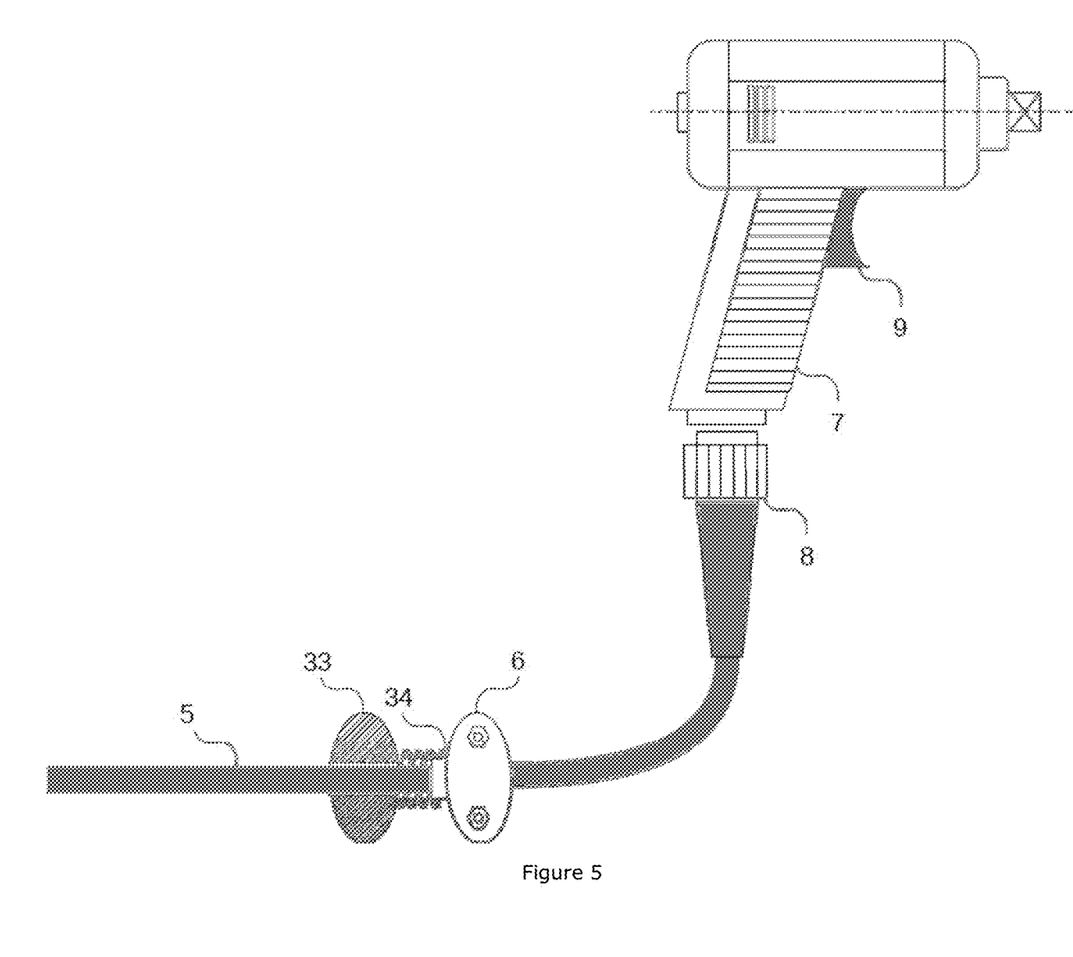
FIG. 5 shows a view of a tool cable with impact absorbing bumper assembly and portable electronic tool mounted thereupon.

Finally, portable electrical tools without spare switch member can be programmed as such that the standard functionality of the tool trigger switch is extended by incorporating a pulse communication system. FIG. 5 displays a possible embodiment of a portable electronic tool (7) connected to a cable reel assembly according to the invention. Each pull to the tool trigger switch (9) generates an electric signal, analogue or digital, running from the tool (7) via the tool cable (5) to the tool controller unit (1). Because said tool cable is connected to the motorized cable reel, this signal is captured by the reel controller board and converted into a pulse. Then the number of pulses is counted by the microprocessor on the reel controller board, and defined as a received pulse sequence. Next, said received pulse sequence is compared against a register of pre-programmed pulse sequences, whereby each pre-programmed sequence is linked to one specific task, for instance, launching motorized retraction. If there is a 100% match between said received pulse sequence and one of the pre-programmed pulse sequences, then the corresponding task is initiated by the reel controller board. If there is no 100% match between said received pulse sequence and one of the pre-programmed pulse sequences, then the received pulse sequence is ignored and nothing happens. This method enables the assembly line operator to launch the motorized retraction of the tool cable from a distance and without requiring any other switch member apart from the tool trigger switch already available.

With this integrated pulse communication system, the reel according to present invention can initiate a variety of tasks, such as launching retraction, interrupting retraction, increasing retraction speed, decreasing retraction speed, etc. The number of pulses are free to choose and are programmable at will, offering a wide array of usable functions and rendering the present invention particularly versatile. Most common functions are already pre-programmed but can easily be modified to suit operator's needs.

An example of these pre-programmed functions based on the detected pulse communications may be as follows: 1 pulse matches a command to launch a motorized retraction of the tool cable; 2 pulses matches a command to interrupt the motorized retraction; 3 pulses matches a command to increase the retraction speed by X %, for instance 10%; 4 pulses matches a command to decrease the retraction speed by Y %, for instance 10%.

Ideally, the capturing, interpretation and conversion process inherent to aforedescribed pulse communication system is done by a microprocessor on the reel controller board. A major advantage of this particular embodiment is that the cable reel according to the present invention becomes easy to install (plug-and-play) and easy to use as no additional programming is required.

In another embodiment, capturing signals from the tool trigger switch is done by the microprocessor of the tool controller unit. Incoming signals are subsequently diverted from the tool controller unit through the I/O connector of the reel to the microprocessor on the reel controller board, and are then processed in the same manner and against the same pre-programmed pulse-sequences as described above, hence initiating the corresponding task. This embodiment requires additional programming on the tool controller unit, and also requires a lead connection between the tool controller unit and the I/O connector of the reel.

Alternatively, the capturing, interpretation and conversion process inherent to aforedescribed pulse communication system is done by the microprocessor of the tool controller unit. Incoming signals from the tool trigger switch are subsequently interpreted and converted in the same manner and against the same pre-programmed pulse sequences as described above. Only if a 100% match occur, the appropriate signal is sent from the tool controller unit through the I/O connector of the reel to the reel controller board, the latter initiating the corresponding task. This embodiment requires additional programming on the tool controller unit, and also requires a lead connection between the tool controller unit and the I/O connector of the reel.

In a preferred embodiment, the pulse communication system is equipped with an audio and visual output so the assembly line operator can hear and see from a distance that the pulls, applied to his tool trigger switch, are well captured by the reel controller board. Both outputs can also be used to notify bystanders during motorized retraction of the tool cable.

The aforedescribed pulse communication system is new in cable reel technology and opens a wide range of practical possibilities. Besides communication with the cable reel (e.g. launch motorized retraction), the said pulse communication system is also useful to communicate with tool controller unit (e.g. launch new tightening sequence) or with factory's Control Room (e.g. next car may enter allocated assembly area). Of course, as the person skilled in the art will understand, many other working schemes and practical applications can be considered too.

Furthermore, in a preferred embodiment the cable reel according to the present invention contains a safety device serving in such a manner that, when the tool cable should somehow get caught while being retracted, the motorized retraction ceases automatically. The said safety device is based on a current measurement system provided on the reel controller board. When the current exceeds a pre-set value, the driving motor stops immediately. To relaunch the motorized retraction, the operator gives another pulse on one of the switch members available, preferably the trigger switch of the tool. The value of the current limit is adjustable by means of potentiometers on the reel controller board. This feature is useful in particular as the motor-driven cable reel can be mounted at different heights, hence demanding different current values due to the weight of the cable.

In addition, the cable reel according to the present invention may also be provided with a mechanical or preferably electromagnetic brake mechanism. When not in use, a failsafe brake enables a portable electrical tool to be stationary suspended at the reel without additional tool support, and which during switch-off or during a power failure prevents the tool from dropping down. The brake is engaged when the total length of the cable is retracted and the driving motor of the reel stops the moment the bumper pushes the pivoting guiding means upwards. The brake disengages when the operator uses one of the switch members available, preferably the tool trigger switch, or by lifting the portable tool out of a tool holder with integrated switching device.

A short pull on the cable equally disengages the brake too. Unlike the motor-driven cable reel described in EP 1,551,086, the applicants of the present motor-driven cable reel have found a better and low-cost solution to eliminate the necessity for an encoder system. For experience, especially in automotive factories, has shown that an encoder system, essential for detecting any pulling on the cable, is vulnerable to impact shocks and vibrations, and therefore needs regular replacement. Changing an encoder requires a meticulous and time consuming intervention from maintenance personnel. With the motor-driven cable reel according to the present invention, in contrast, the detection of pulling on the cable is achieved by implementing a very different technology. As the drum remains in direct engagement with the reels driving motor, the latter generates a electromotive force (EMF) the moment someone pulls the cable. This electromotive force is captured by the reel controller board and converted into a signal to disengage the electromagnetic brake.

The general working procedure of the cable reel according to the present invention can be described as follows:

When not in use, the portable electrical tool is stationary suspended on the cable reel, the cable is fully retracted, and the brake is engaged. In order to unwind a quantity of cable from the drum, it suffices to grab the cable at the portable electrical tool and give a short pull. This movement generates an electromotive force which disengages the brake mechanism and allows to unwind manually the desired length of cable with minimal physical effort. A slight counterforce, generated by the motor and gear configuration, prevents the drum from rotation after the pulling on the cable has ceased. In order to subsequently retract the cable once the tightening job is finished, it suffices to give one short pull to the tool trigger switch (unless another mode of retrieve signal is used). This signal is captured a converted into a retrieve signal. As a result thereof, the cable gets retracted automatically whereby the retraction speed of the cable equals the walking pace of the operator. During retraction, the brake mechanism remains disengaged, which enables the driving motor rotating the drum. The motorized retraction can be interrupted by holding back the cable or by giving two short pulls to the tool trigger switch (unless another mode of retrieve signal is used). When the rubber cable obstruction mounted on the cable hits the guide rollers, the said bumper pushes the pivoting guiding means from its initial 90° position towards a 45° position. This pivoting movement of the arm is captured by a switching device which interrupts the driving motor and engages the brake mechanism. A tensioned spring member brings the pivoting guiding means back to its initial position, leaving the electronic tool suspended in a stationary position on the reel. In this manner, a very safe reel is obtained, as a result of which, only the desired quantity of cable has to be unwind and whereby the assembly line operator is in full control of the motorized retraction.

It is to be considered that the above embodiments may be joined with any one of the following embodiments as well.

In a third aspect, the invention describes the use in the automotive industry of a cable reel assembly according to any one of the preceding embodiments.

In a fourth aspect, the present invention provides an improved cable reel assembly for holding a wound quantity of tool cable, wherein said tool cable comprises at a first end a means to connect to a portable electrical tool, and at the other end a means to connect to an electronic control system for said tool, said cable reel assembly comprising:
- a. a supporting frame having a fixed hub holding an elongated shaft projecting from said hub and said supporting frame, said shaft having a central axial aperture extending therethrough;
- b. a slip ring capsule for signal transfer, said slip ring capsule being provided within the central axial aperture in said shaft and along the central axis of said shaft, said slip ring capsule comprising:
  - a. a set of contact brushes;
  - b. a set of contact slip rings for electrical contact with the set of contact brushes, and rotatably mounted relative to the set of contact brushes;
- c. a rotatable reel comprising a hub, whereby said hub is mounted rotatably around the shaft, which reel further comprises a hollow drum attached to said hub, preferably said hollow drum comprising two flanges projecting radially therefrom, with said flanges having sufficient height to accommodate a cable therebetween wound on said drum;
- d. an electric motor for alternately rotating said drum around said shaft in a first direction to pay out a cable attached to said reel assembly and/or drum, and for rotating said drum around said shaft in a second opposite direction to retrieve paid out cable for containment on said reel assembly and/or drum;
- e. an electronic control system to drive and control the rotation of the drum;
- f. a guiding means for guiding the cable to and from the drum, whereby said guiding means is rotatably mounted on and around the shaft, whereby said guiding means is adapted to rotatably move or pivot between a wound position and a winding position, said guiding means comprising a cable guide for leading the cable whereby the cable guide is adapted for obstructing the first end of said cable, and whereby the guiding means is moved to the wound position when the cable guide is contacting the first end;
- g. a pulling means, preferably a spring member, for exerting a torque on the guiding means towards the winding position;

whereby the cable reel assembly comprises a movement sensor for determining the movement of the guiding means, whereby said the electronic control system controls the rotation of the reel based on said positioning.

As mentioned before, the known cable reel systems insufficiently protect the cable from impact during the automated winding of the cable on the reel, potentially damaging the cable, which leads to downtime due to the need to replace the cable, as well as danger as this concerns a cable conducting (high) electrical currents, aside from the cost of the cable itself that needs to be replaced.

Some efforts have been taken in a few cases to protect the cable, for instance via the use of a pulse encoder, which attempts to keep an account on the state of 'unreeledness' of the cable, by counting the rotations of the drum around which the cable is wound typically, and while the cable is rewound, by keeping this count, and reducing speed when the count goes to zero. However, in practice, reducing the speed requires more time from the assembly line operator to react. More importantly however, the number of rotations the reel will need to reel the cable back in cannot be considered as a defined number, as this is influenced amongst others by the way the cable is stored (for instance, if the cable is reeled mainly on one side of the drum, resulting in a faster increasing radius and thus fewer rotations necessary for a fully wound cable). This shows that the impact of the cable at the end of in the retraction process may still very easily happen. Furthermore, the use of a pulse encoder system will make the cable reel much more costly, not to mention more delicate, both strong disadvantages for a rather basic device which is used in great number in industrial applications.

The applicant has solved this problem aptly by providing a pivotable guiding means, which guiding means is adapted to lead the cable to and from the drum. The guiding means can pivot around the shaft of the cable reel assembly between two positions, a wound position (when the cable is fully wound up) and a winding position (when force is being reeled in or when force is exerted on the cable), with a pulling means (typically a spring member) that exerts torque on the guiding means to revert it to the winding position (away from the wound position). As soon as the end of the cable reaches the guiding means, it will be pulled from the winding position towards the wound position by the (distal end portion of the) cable (which is still being reeled in by the electric motor), with the pulling means slowing down this movement, and very importantly, mitigating at least part of the impact.

In a further improvement, the applicant has added a sensor means or detection means capable of determining the movement of the guiding means to some extent. Said sensor is then adapted to control the electric motor based on said movement, which allows the sensor to control the rotation of the drum, and thus the (un)winding of the cable, and effectively stopping any such movement and (un)winding.

By "determining the position", it is not meant that the sensor can necessarily determine the exact positioning (though this may be the case). In a possible embodiment, "determining the position" may reflect that the position of the guiding means with respect to a threshold position is determined. Alternatively, only one or both extremal positions can be determined (wound position or winding position, though preferably at least the guiding means being in or near the wound position can be determined). This can for instance be accomplished by a button or pressure sensor being present, being pressed when the guiding means reaches one or both of said positions, or gets near to these positions.

In a possible embodiment, the electric motor could slow down the rotation of the drum as the guiding means moves towards the wound position. However, due to the fact that reeling in the cable is a fast process, and especially once the rubber cable obstruction (bumper means) of the cable reaches the guiding means, it is preferred that the electric motor effectively halts the rotation of the drum to ensure that the strength of the shock or impact is highly reduced if the impact is not altogether avoided. Preferably, the electric motor halts the rotation once the guiding means passes a certain threshold position. While this threshold position could be the same as the guiding means actually reaching the wound position, in many embodiments, the threshold position is between the winding position and the wound position. As long as the guiding means is in the winding position, the rubber cable obstruction of the cable is not obstructing the guiding means. Once the rubber cable obstruction touches the guiding means, the guiding means will start moving towards the wound position as the cable keeps being reeled in with the rubber cable obstruction being blocked by the cable guide, thus pulling (or pulling) the guiding means (the part of the guiding means holding the rubber cable obstruction) towards the drum. At the wound position, the guiding means cannot any longer compensate for the electric motor attempting to reel the cable in further. By halting the rotation at a point after leaving the winding position but before reaching the wound position, the remaining impact from the inertial movement of the cable will be greatly reduced, if not entirely nullified.

In a preferred embodiment, the electric motor is adapted to halt the rotation of the drum along at least the winding direction when the position sensor determines the guiding means is in the wound position.

In an alternatively preferred embodiment, said electric motor is adapted to halt the rotation of the drum along at least the first rotational direction when the position sensor determines the guiding means to be closer to the wound position than a predetermined threshold position, said threshold position lying between the wound position and the winding position.

In a preferred embodiment, said position sensor is an inductive sensor mounted on the supporting frame and adapted to detect the guiding means to passing a threshold position by inductively detecting the movement of part of the guiding means, for instance detecting when the guiding means is closer to the wound position than a predetermined threshold position, and said inductive sensor configured to halt the rotation of the drum in at least the first rotational direction when detecting movement of the guiding means. Alternatively, the sensor may be positioned so that it only detects when the guiding means is further from the wound position than the threshold position. In both cases, the threshold position may simple be the wound position. However, it is preferably so that the predetermined position lies between the wound position and the winding position.

The use of an inductive sensor allows the movement of the guiding means to be detected easily and with great surety, while being a relatively cheap element for the assembly. The guiding means can easily be adapted and/or the position of the inductive sensor can easily be chosen, so that the movement of the guiding means may be detected. Especially in view of some of the further embodiments, above, this can prove useful.

As mentioned, it is preferred that only the rotation in the first rotational direction ('reeling rotation') is halted, so the cable may still easily be unreeled (rotated in the second rotational direction). The rotation being "halted" is to be understood as the rotation in that direction to be blocked, or countered (slowed) by an opposite force or torque. Preferably however, the rotation in said direction is stopped altogether.

In a further preferred embodiment, the spring is minimally stretched or compressed when the guiding means is in the winding position. This is a measure in order to ensure that the spring does not lose its functionality over time too quickly.

In a preferred embodiment, the guiding means comprises an arm which is pivotably mounted on and around the shaft of the supporting frame, and a cable guide at the distal end of the arm, and whereby the cable guide comprises an opening through which the cable is led. Preferably said opening comprises a number of guide rollers over its perimeter, to guide the cable over in a smooth fashion. By having an opening or window through which the cable is lead, it is ensured that the cable cannot escape from the cable guide (for instance by the cable jumping). This means that the window allows the cable (and the tool mounted thereon) to be used in a wider range of directions by an operator.

The cable reel of this invention may be made of any convenient material, including various metals and plastics. Spring steel, steel, stainless steel, aluminum, titanium, and various alloys of these and other metals may be used for appropriate parts, as can plastics such as the various engineering plastics and thermosets, as well as high density thermoplastics. Of course the various electrical parts will be made of appropriate electrically conductive materials such as gold, copper or aluminum. Those skilled in the art will have no difficulty determining the appropriate materials for the various parts of the device by common knowledge or routine experimentation.

Yet another advantage of the present invention is that the reel is completely free of silicone. Since no silicone can be used in car assembly plants, silicone grease has been removed and replaced by another type of grease in the worm wheel motor assembly of the reel.

Yet another advantage of the cable reel according to the present invention consists in the fact that the reel is very easy to install and to operate. The reel of the present invention may be installed horizontally or vertically, may be freely used or fixed to a wall or a working floor, or suspended to a ceiling, and so forth. In particular, the reel can be installed either on the working floor, on a wall, on a ceiling or at a particular angle, even at a 45° angle.

In addition, another advantage of the present invention is that the cable can be immediately retracted upon finishing the work task. The advantage thereof is that retraction of the cable starts as soon as the operator is ready and walks back to his starting position. During his movement towards the reel, the operator does not have to step over the cable and, therefore, does not have to take care as to where to put his feet, so precluding the danger of tripping accidents.

Another advantage of the cable reel according to the present invention is the possibility to adjust the retraction speed of the cable. To exclude tripping accident the cable must retract in front of the operator's feet. To do so, the retraction speed can easily be adjusted to suit the individual walking pace of each operator. The retraction speed can be chosen between 0.5 m/sec. (slow walk) and 3.0 m/sec (fast walk). A bright LED indicator on the reel points out the chosen speed. If wanted, the retraction speed can be locked in any position by changing a dip switch position on the controller board.

The invention is further described by the following non-limiting examples which further illustrate the invention, and are not intended to, nor should they be interpreted to, limit the scope of the invention.

EXAMPLES

Figure 1:
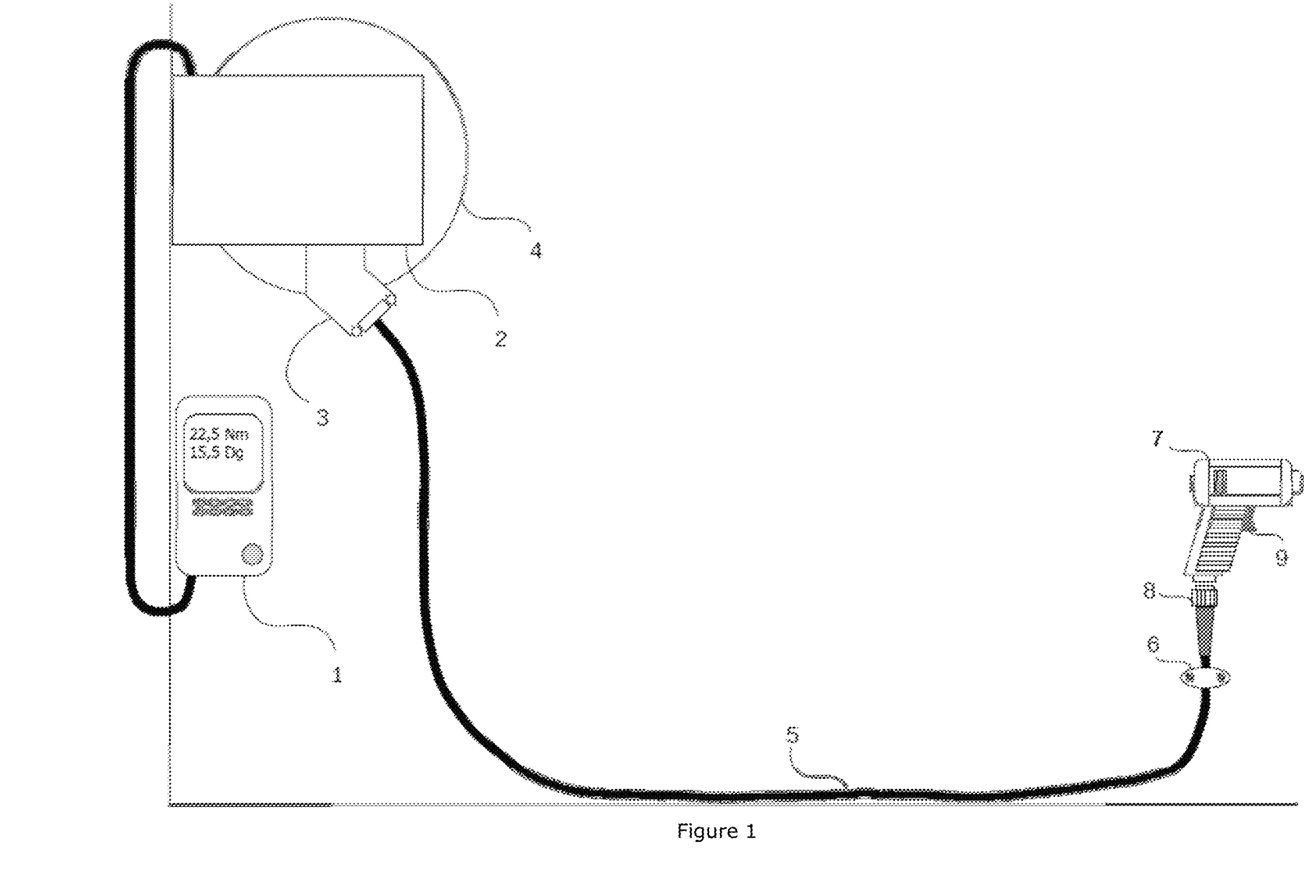
FIG. 1 shows a typical arrangement of a controller unit, cable reel, unwound cable and tool according to an embodiment of the invention.

FIG. 1 illustrates a typical arrangement compromising a tool controller unit (1), a cable reel (2) with guiding means (3), to which a tool cable (5) with a bumper (6) is connected to a portable electrical-driven tool (7) in a suitable manner, generally by a connector (8) with a bayonet-type fitting.

Advantageously, the cable provided on the reel is connected or comprises means to connect at one extremity to different types of electrical tools. Thus, the reel of the present invention may be employed in combination with various accessories. Connection of a portable electrical tool to a cable is generally dependent on the type of connection provided on the tool itself. The cable reel according to the present invention can be provided with connectors of various types by providing a cable suitable for connecting the tool on the reel or by providing a standard cable having a suitable connector at its extremity for connecting the tool.

In addition, the connector has preferably a bayonet-type fitting, which enables easy and rapid disconnection of the electrical cable from the reel or from the tool in case of defect or rupture of the cable. Other type of connectors may be required depending on existing tool cable lay outs. From an ergonomic point of view, the connector (8) at the tool side of the cable preferably offer different degrees of freedom of rotation in order to allow easy manipulation of the connected tool (7) in all directions.

FIG. 2 offers a detailed view of the internal structure of the cable reel, showing following key components:

Reel supporting frame (2) with pivoting guiding means (3) and controller board (18); fix hub (17) with elongated shaft (16) containing axial aperture (32) to house slip ring capsule for signal transfer (24) and a slip ring arrangement for power transfer (20); rotating hub (19) with bearing material (31), gear wheel (27) and closed drum (25) with inner flange (26) and outer flange (4) to accommodate tool cable (5); brush holder (21) with contact brushes for power transfer (22); gear wheel (28) connected to worm drive gear (29) and driving motor (30).

The reel drum (25) is sufficiently wide, and the inner (26) and outer (4) flanges sufficiently high to hold all of the length of cable (5) on the reel when the cable is fully retracted. The reel may be of any convenient size to meet the needs of particular application. Those skilled in the art will be readily able to determine the appropriate dimensions for any contemplated end use.

It is essential to observe the absence of any type of clutch between the driving components and the drum. The motor and gear configuration of the present invention is continuously in direct engagement for alternately rotating said drum about shaft in one direction to pay out a cable contained thereon and attached thereto, and for rotating said drum about said shaft in the opposite direction to retrieve paid-out cable for containment on said drum (reel assembly).

The motor and gear configuration is in direct engagement with the rotating hub (19) by means of a first gear wheel (28) provided on the shaft of said worm drive gear (29), and with a second gear wheel (27) that is attached to the rotating hub (19) of the drum. Preferably both gear wheels are made in a material that does not need greasing, whereas said rotating hub has maintenance-free low-friction bearings (31), thus rendering the present invention 100% maintenance-free.

The reel according to the present invention is motor driven (30). Depending on the application and depending on the driving means available, the reel according to the present invention can be driven by electric, pneumatic or hydraulic motor. As electricity is commonly available in factories, an electric motor is preferable.

More specifically, the cable reel according to the present invention is provided with a supporting frame (2) having a fixed hub (17) with elongated shaft (16) projecting therefrom, as illustrated by FIG. 2. Said elongated shaft has a central axial aperture (32) extending therethrough wherein a slip ring capsule for signal transfer (24) is disposed. Next to the axial aperture are one or more extra lateral passages (11) running parallel to said aperture in the center of the elongated shaft. Said extra lateral passages are applied to direct power conductors (23) running from the stationary supporting frame (2) into the sealed but rotating drum (25) cavity. Once inside the cavity of drum, each power conductor (23) is appropriately connected to one power slip rings (20). Each power slip ring (20) has its own power contact brush (22), both constantly remaining in contact with each other. The power contact brushes are mounted in a contact brush holder (21), the latter being attached to the rotating inner flange (26) of the drum by means of anchor bolt. Each power contact brush (22) is appropriately connected directly or via a connector to the corresponding wire of the tool cable. The power contact rings (20) are attached to the elongated shaft (16) of the reel, which remains stationary. Thus each power contact ring and each power contact brush creates a conductive path, whether the contact brush is or is not rotating relative to the contact ring. This embodiment allows current to flow continuously from the tool controller unit (1) through the stationary supporting frame (2) and through the rotating drum (25) to the portable electrical tool (7) without interruption.

Figure 3:
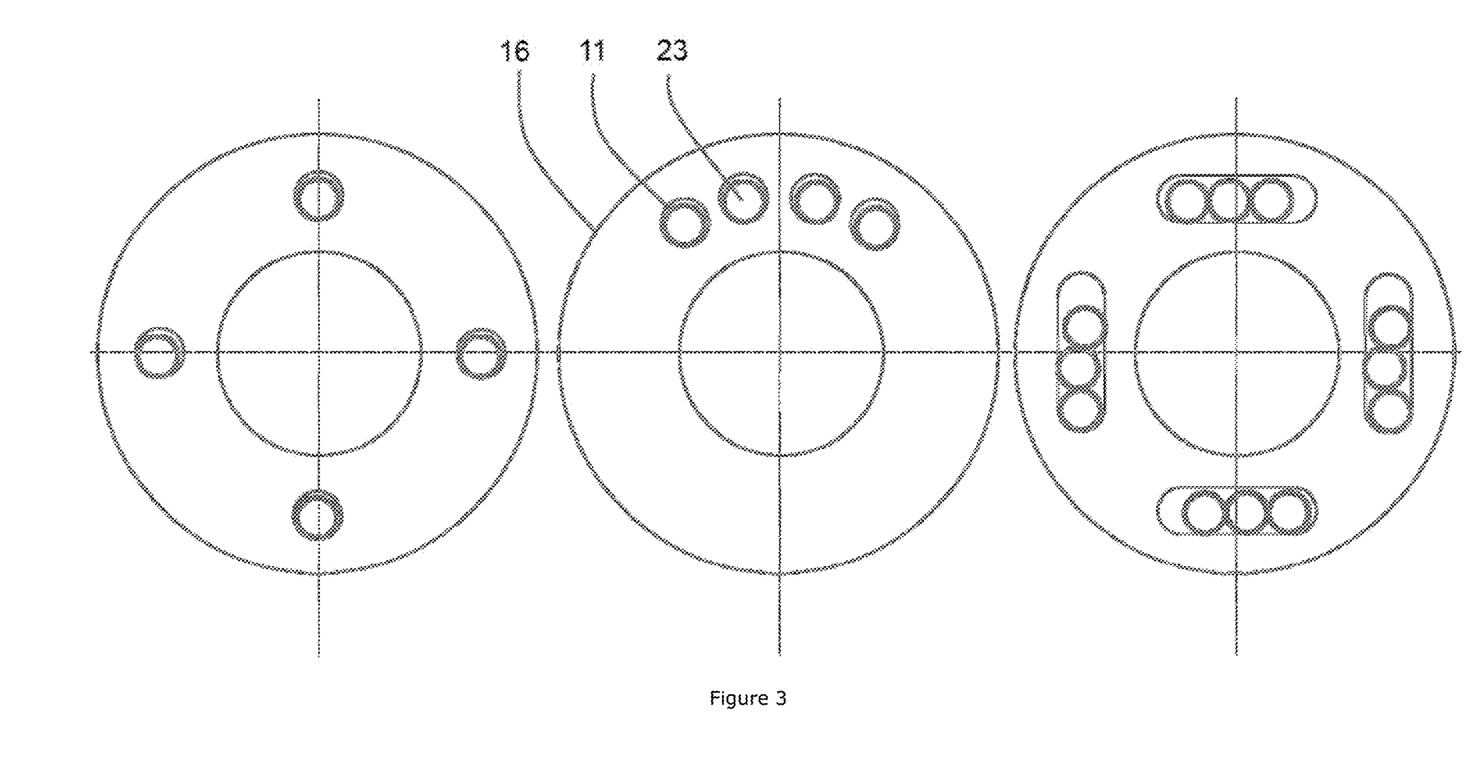
FIG. 3 shows different a number of different cross sections of the shaft with the extra lateral apertures for the power conductors.

With this specific embodiment, applying separate slip ring assemblies and an elongated shaft with extra lateral passages, the distance between power conductors and signal wires remains wide enough to avoid electromagnetic interference. Furthermore, the type of electric motor applied by portable electrical tool manufacturers determines the number power conductors. Depending on the number of power conductors, many embodiments of the extra lateral passages are applicable. Several alternative designs are illustrated in FIG. 3.

Another important improvement of the cable reel according to the present invention relates to its pivoting guiding means. Experience learns that motor-driven cable reels designed with fixed guiding means (e.g. EP 1,551,086) have a negative effect on the durability of the tool cable. In working situations with high frequency, such as modern car assembly lines, the number of retraction cycles can mount to 800 a day. At the end of each retraction cycle, a firmly fixed bumper mounted at one extremity of the cable collides with considerable impact upon the guide rollers of the guiding means. The continuous collision between fixed bumper and fixed guiding means damages eventually the inner structure of the tool cable. Because these collisions occur repeatedly and always at the same spot, the individual wires inside the tool cable will eventually break, hence interrupting the performance of the tool and bringing production to a halt.

Figure 4:
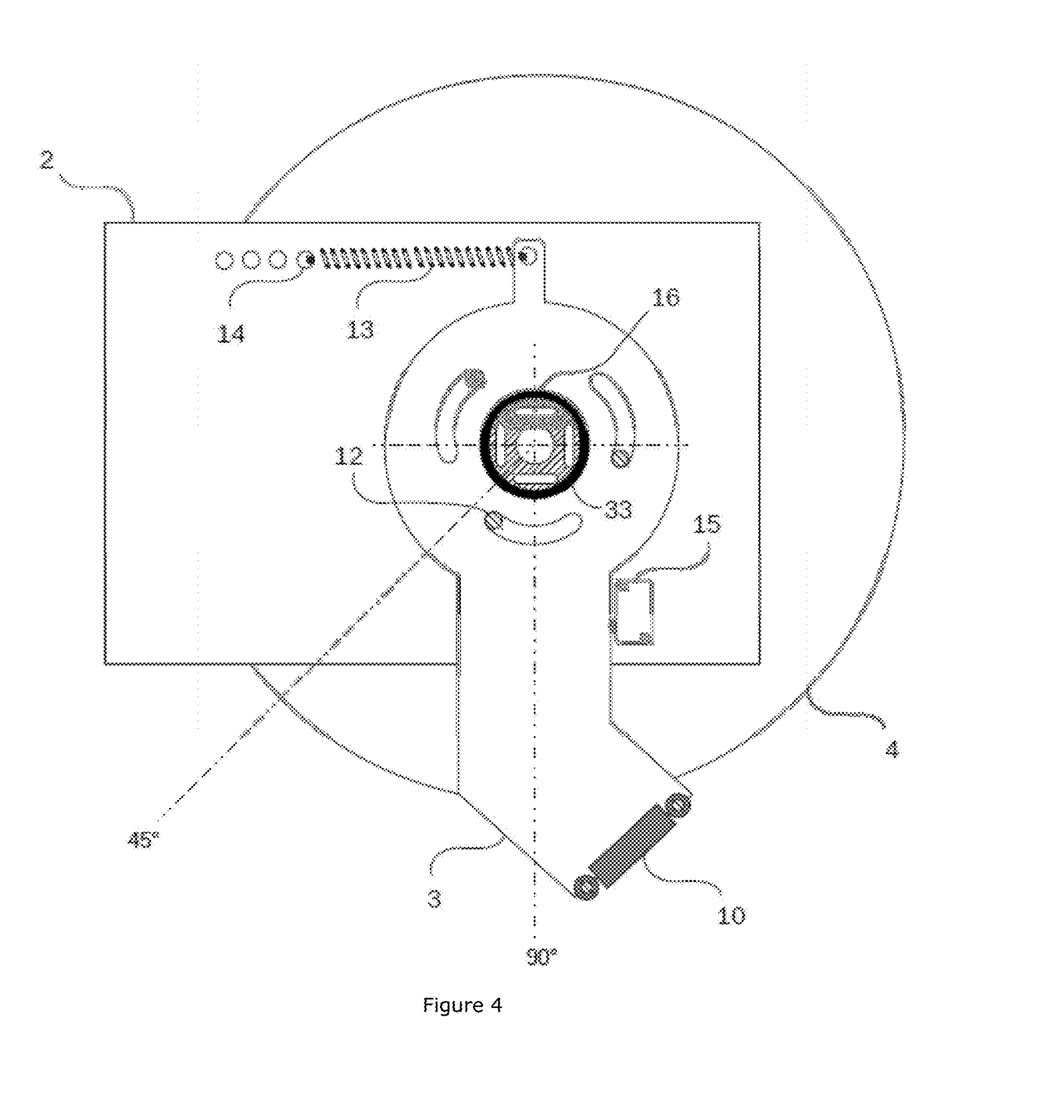
FIG. 4 shows a view of the pivoting guiding means with a switching means.

To overcome this major disadvantage, the reel according to the present invention introduces an impact absorbing solution that can best be understood by referring to FIG. 4. A pivoting guiding means (3) can move upwards and downwards around the elongated shaft (16) of the reel, using a maintenance-free low-friction bearing (33). Guiding slots with appropriate guiding members (12) secure the stability and limit the actual travel of the arm. At one end, a pre-tensioned spring member (13) connects said guiding means to the reel supporting frame (14), keeping said guiding means in its initial position. At the other end of the guiding means, a set of guide rollers (10) is provided to protect the outer jacket of the cable during unwinding and rewinding. Further, a bumper (6), preferably made of rubber and bigger than the passage between the said guide rollers, is attached firmly to the cable outer jacket at the far end of the cable, preventing damage to the portable tool (7) while retracting the unwounded cable. When, at the end of the retraction cycle, said bumper hits said guide rollers, the former pushes the pivoting guiding means from its initial 90° position towards a ca. 45° position. This movement causes the spring member (13) to gradually build-up tension, thus decelerating the movement of the guiding means. Applicants have found that the angle (travel) of the actual movement, the distance from the guide rollers to the center of the guiding means, and the mechanical characteristics of the spring member in particular, have to be well chosen in order to maximize the degree of impact absorption. By implementing this method, about 70% of the impact force upon the cable is absorbed by said spring member.

Depending on the speed of the motorized cable retraction, adjusting the pre-tension of said spring member may be required to obtain an optimal degree of impact absorption. For this reason, several apertures (14) are provided in the reel supporting frame. By moving one end of the spring member to another aperture, it becomes possible to increase or decrease the pre-tension of said spring member.

In a preferred embodiment, an impact absorbing bumper assembly as shown in FIG. 5 is applied to absorb much of the remaining 30% impact force. Said bumper assembly comprises a clamp member (6) that is firmly attached to the outer jacket of the cable, a spring member (34), and a rubber bumper or rubber cable obstruction (33) moving freely along the cable outer jacket. When said bumper hits upon the guide rollers (10) of the reel, the spring becomes contained between the guide rollers (10) and the clamp member (6), thus absorbing much of the remaining impact force.

Finally, the aforedescribed pivoting movement of the guiding means is captured by a switching device (15), preferably mounted in the supporting frame of the reel (as can be seen in FIG. 4). Once the pivoting guiding means moves more than 10° in upwards direction, the said switching device detects this movement and interrupts the motorized retraction. Without retracting force from the motor, the tensioned spring member brings the pivoting guiding means back to its initial position.

The cable reel according to the present invention comprises many additional advantages. One advantage relates to the fact that the reel according to the invention is compact. The reel may be of any appropriate reasonable size for a particular task. Those skilled in the art will have no difficulty determining appropriate sizes of reels for particular tasks.

Another advantage of the cable reel according to the present invention consists in the fact that the reel is very easy to install. The overall design is such that the cable reel can be installed horizontally or vertically, fixed to a wall or a production floor, or suspended to a ceiling, or even at a 45° angle.

Another advantage of the cable reel according to the present invention is the fact that the reel is very easy to use. The reel's functionality is kept straightforward so it does not require special skills nor training from the assembly line operator. Furthermore, all driving components and gear are carefully chooses in such a manner that employing the cable reel requires very little physical effort (ca. 4 Nf) form the assembly line operator. It also offers the possibility of adjusting the motorized retraction speed of the cable. Ideally, the cable should retract in front of operator's feet. As different people have different walking paces, the retraction speed can be adjusted to suit the individual walking pace of each assembly line operator. The retraction speed can be chosen anywhere between 0.5 (slow walk) and 1.5 meters per second (fast walk) by a potentiometer mounted in the supporting structure of the reel.

Another major improvement of the present invention is that the cable can be immediately retracted upon finishing the operator's tightening job. The advantage thereof is that retraction of the cable in launched the moment the operator walks back to his initial starting point. With the aforementioned retraction speed set at the right value, the assembly line operator does not have to step over the cable and, therefore, does not have to take care as to where to put his feet. The possibility of launching the motorized retraction from a distance, combined with the adjustable retraction speed above, renders the present invention particularly safe to use.

It is supposed that the present invention is not restricted to any form of realization described previously and that some modifications can be added to the presented example of fabrication without reappraisal of the appended claims. For example, the present invention has been described referring to electric cables for power tools, but it is clear that the invention can be applied to general cables for instance or to other windable, elongate elements.

The invention claimed is:

1. Cable reel assembly for holding a wound quantity of tool cable, wherein said tool cable comprises at a first end a means to connect to a portable electrical tool, and at the other end a means to connect to an electronic control system for said tool, and wherein said cable reel assembly comprises an electronic control system to drive and control the rotation of the reel assembly for retracting or paying out the tool cable, said cable reel assembly comprising:
   a. a supporting frame having a fixed hub holding an elongated shaft projecting from said hub and said supporting frame, said shaft having a central axial aperture extending therethrough;
   b. a slip ring capsule for signal transfer, said slip ring capsule being provided within the central axial aperture in said shaft and along the central axis of said shaft, said slip ring capsule comprising:
      i. a set of contact brushes;
      ii. a set of contact slip rings for electrical contact with the set of contact brushes, and rotatably mounted relative to the set of contact brushes;
   c. a rotatable reel comprising a hub, whereby said hub is mounted rotatably around the shaft, which reel further comprises a hollow drum attached to said hub of the reel;
   d. an electric motor for alternately rotating said reel around said shaft in a first direction to pay out a cable attached to said reel assembly, and for rotating said reel around said shaft in a second opposite direction to retrieve paid out cable for containment on said reel assembly;
   e. an electronic control system to drive and control the rotation of the reel;
wherein the shaft comprises at least one, contact ring on its outer surface, and whereby said reel further comprises a contact brush holder comprising at least one contact brush for continuous electrical contact and transferring electric power, for the portable electronic tool, with the at least one contact ring on the shaft, which contact brush holder is attached to the hollow drum extending along the axis of rotation of the hub of the reel, whereby the portion of the shaft comprising said contact ring is provided within the hollow drum, whereby the contact brush holder is provided within the hollow drum, and whereby the slip ring capsule is at least partially provided within the hollow drum, thereby separating the signal transfer from the electric power transfer, whereby said hollow drum has a closed barrel being entirely closed at the furthest end of the closed barrel facing away from the supporting frame and whereby the closest end of the closed barrel facing towards the supporting frame is attached to the hub of the reel, thereby forming a closed surface around the shaft, and whereby the hub of the reel is rotatably mounted on the shaft by bearing materials.

2. Cable reel assembly according to claim 1, whereby the contact brushes of the contact brush holder are electrically connected directly to the tool cable to provide power to said tool cable.

3. Cable reel assembly according to claim 1, whereby the rotatable reel comprises a gear wheel, and whereby the electric motor comprises a gear wheel in continuous driving contact with the gear wheel of the reel, for rotating said reel.

4. The cable reel assembly according to claim 3, wherein the gear wheel is attached to the hub of the reel.

5. Cable reel assembly according to claim 1, whereby the electric motor comprises a worm drive gear and said electric motor being adapted to drive said worm drive gear, whereby said worm drive gear comprises a shaft upon which the gear wheel of the electric motor is mounted to effect rotation of said gear wheel by said worm drive gear.

6. Cable reel assembly according to claim 1, further comprising a guiding means mounted rotatably around the shaft, whereby the distal end of the guiding means comprises a cable guide provided with a set of rollers for guiding the tool cable to and from the reel, and whereby said guiding means is connected by a spring member to the supporting frame, whereby said spring member extends essentially tangentially around said shaft.

7. The cable reel assembly according to claim 6, wherein the spring member is connected to the guiding means on the opposite side of the cable guide with respect to the rotational axis of the guiding means.

8. Cable reel assembly according to claim 1, whereby the cable reel assembly comprises a switching means, said switching means being adapted to determine the rotational orientation of the guiding means, and configured to control the electric motor based on said rotational orientation.

9. Cable reel assembly according claim 1, whereby the switching means is configured to halt the rotation of the reel when the rotational orientation of the guiding means passes a predefined cut-off orientation in the second direction.

10. Cable reel assembly according to claim 1, whereby one or more power conductors for conducting the electric power from a power source to the contact ring on the shaft, extend axially through said shaft from one side of the supporting frame to the opposite side.

11. The cable reel assembly according to claim 10, wherein there are at least two or more of said power conductors whereby said at least two or more power conductors extend separately via non-central axial passages through the shaft.

12. Cable reel assembly according to claim 1, wherein the electronic control system is adapted to receive signals from the portable electronic tool attached at the first end of the tool cable, and whereby the electronic control system is further adapted to detect pulses in said signals and count one or more subsequent pulses, wherein the electronic control system is configured to execute one or more pre-programmed actions based on the detected number of subsequent pulses, said pre-programmed actions comprising: starting the retraction of the tool cable, stopping the retraction of the tool cable.

13. Cable reel assembly according to claim 12, wherein said signals from the portable electronic tool are control signals for starting or stopping the supply of power to the portable electronic tool.

14. Cable reel assembly according to claim 12, comprising a portable electronic tool, whereby said portable electronic tool comprises a tool trigger switch to send signals to the electronic control system for starting or stopping the supply of power to the portable electronic tool, and whereby the signals of said tool trigger switch are analyzed to detect and count subsequent pulses in said signals for the starting or stopping the retraction of the tool cable based on the number of said subsequent pulses.

15. Cable reel assembly according to claim 12, whereby the electronic control system drives and controls the rotation of a reel for collecting or paying out the tool cable, said reel being mounted rotatably on a supporting frame around a shaft projecting from said supporting frame.

16. The cable reel assembly according to claim 12, and furthermore comprising slowing down the retraction of the tool cable and speeding up the retraction of the tool cable.

17. Use of a cable reel assembly according to claim 1 in the automotive industry.

18. The cable reel assembly for holding a wound quantity of tool cable according to claim 1, wherein said hollow drum comprising two flanges projecting radially therefrom, with said flanges having sufficient height to accommodate a cable therebetween wound on said drum.

\* \* \* \* \*